United States Patent [19]

Barnabeo

[11] 4,408,011

[45] Oct. 4, 1983

[54] POLYSILOXANES AND THE USE THEREOF IN THE PRODUCTION OF SILANE MODIFIED ALKYLENE-ALKYL ACRYLATE COPOLYMERS

[75] Inventor: Austin E. Barnabeo, Bridgewater, N.J.

[73] Assignee: Union Carbide Corporation, Danbury, Conn.

[21] Appl. No.: 416,601

[22] Filed: Sep. 13, 1982

[51] Int. Cl.$^3$ .............................................. C08F 8/00
[52] U.S. Cl. ...................................... 525/100; 528/15; 528/17; 528/19; 528/18; 528/26; 556/440
[58] Field of Search .................... 556/440; 528/26, 18, 528/19, 15, 17; 525/100

[56] References Cited

U.S. PATENT DOCUMENTS

| | | |
|---|---|---|
| 3,159,496 | 12/1964 | Rossmy . |
| 3,161,611 | 12/1964 | Rossmy . |
| 3,193,567 | 7/1965 | Rossmy . |
| 3,408,420 | 10/1968 | Wiggill . |
| 3,441,545 | 7/1969 | Blatz et al. . |
| 3,861,915 | 1/1975 | Cawley ................................ 528/36 |
| 3,962,299 | 6/1976 | Stackman ............................... 528/26 |
| 4,026,826 | 5/1977 | Yoshida et al. ........................ 528/26 |
| 4,291,136 | 9/1981 | Keogh . |
| 4,328,323 | 5/1982 | Keogh . |

OTHER PUBLICATIONS

Gerd Rossmy and Götz Koerner: 1,2-Siloxacycloalkanes, Part 1: Synthesis and Polymerization Properties, pp. 1 through 31; Research Laboratory of Th. Goldschmidt AG, Essen, Ruhr, West Germany.

*Primary Examiner*—Melvyn I. Marquis
*Attorney, Agent, or Firm*—James C. Arvantes; Robert C. Brown

[57] ABSTRACT

Polysiloxanes prepared by reacting a diester and a monomeric silane and the use of the polysiloxanes to produce silane modified, water-curable copolymers by reacting the polysiloxanes with alkylene-alkyl acrylate copolymers in the presence of an organo titanate catalyst. The copolymers so produced can be extruded about electrical conductors and water-cured providing insulation or jacketing thereon.

27 Claims, No Drawings

POLYSILOXANES AND THE USE THEREOF IN THE PRODUCTION OF SILANE MODIFIED ALKYLENE-ALKYL ACRYLATE COPOLYMERS

SUMMARY OF THE INVENTION

This invention relates to polysiloxanes and the use thereof in the production of silane modified alkylene-alkyl acrylate copolymers. The silane modified alkylene-alkyl acrylate copolymers can be extruded about electrical conductors and water cured to crosslinked products, providing insulation or jacketing thereon, which is free of undesirable odors and undesirable internal voids. Being free of undesirable internal voids, the insulation or jacketing is characterized by improved physical and electrical properties such as tensile strength, elongation, insulation resistance and the like. Also, the polysiloxanes of this invention are characterized by improved thermal stability and as a result, the silane modified copolymers produced therefrom are capable of being subjected to longer processing cycles at elevated temperatures without undergoing undesirable thermal degradation.

BACKGROUND OF THE INVENTION

Water curable, silane modified copolymers of alkylene-alkyl acrylates and a process for the preparation thereof by reacting a mixture containing a monomeric silane and an alkylene-alkyl acrylate copolymer are described in detail in U.S. Pat. No. 4,291,136 to Michael J. Keogh, granted Sept. 22, 1981. The silane modified copolymers can be extruded about electrical conductors, such as wire and cable, and water cured to crosslinked products to provide coatings thereon of excellent quality.

It is customery, prior to extruding silane modified alkylene-alkyl acrylate copolymers about wires and cables, to insure removal therefrom of undesirable volatiles. The presence of undesirable volatiles could lead to the formation of voids in the extruded product, marring its appearance, degrading its physical and electrical properties and, in some instances, shortening its working life. In addition, the presence of undesirable voltatiles causes odor problems at the extruder and in the coated wire or cable. Obviously, removal of such volatiles from the silane modified copolymers, by a subsequent devolatilization step after preparation of the copolymers, increases the time and cost required to produce a coated product.

DESCRIPTION OF THE INVENTION

The present invention provides for polysiloxanes and the use thereof in the production of silane modified copolymers of alkylene-alkyl acrylates which are free of undesirable, low boiling volatiles and consequently need not be subjected to a subsequent devolatization step. The silane modified copolymers, prepared in accordance with the present invention, can be directly extruded about wires and cables and water-cured to crosslinked products to provide insulation or jacketing thereon, free of undesirable voids and odors. Furthermore, the polysiloxanes of this invention are characterized by improved thermal stability and the silane modified, water-curable alkylene-alkyl acrylate copolymers produced therefrom are capable of being subjected to longer processing cycles in the production of extruded products, without undergoing undesirable thermal degradation.

The polysiloxanes of this invention fall within the scope of idealized Formula I below:

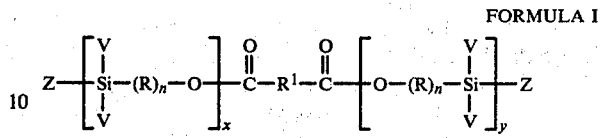

FORMULA I wherein: each R and $R^1$, which can be the same or different, are hydrocarbon radicals; each V, which can be the same or different is hydrogen, a hydrocarbon radical or a hydrolyzable group; each Z, which can be the same or different is a hydrolyzable group; x and y are integers each having a value of at least 1, generally 1 to 20 inclusive, preferably 5 to 10 inclusive and each n, which can be the same or different, is an integer having a value of at least one, generally one to 1000 inclusive, preferably 2 to 25 inclusive.

Illustrative of suitable divalent hydrocarbon radicals for R are alkylene radicals having one to 18 carbon atoms inclusive, preferably one to 6 carbon atoms inclusive such as methylene, ethylene, propylene, butylene, hexylene and the like; aryl and cycloaliphatic radicals having 5 to 18 carbon atoms inclusive, preferably 6 to 8 carbon atoms inclusive such as cyclohexylene, phenylene and the like.

Illustrative of suitable hydrocarbon radicals for $R^1$ are cycloaliphatic and aryl radicals as defined for R.

As stated, each V can be hydrogen, a hydrocarbon radical or a hydrolyzable group. Illustrative of such hydrocarbon radicals or hydrolyzable groups are alkyl radicals having one to 18 carbon atoms inclusive, preferably one to 6 carbon atoms inclusive such as methyl, ethyl, n-propyl, isopropyl, n-butyl, n-hexyl and the like; alkoxy radicals having one to 18 carbon atoms inclusive, preferably one to 6 carbon atoms inclusive such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl, oxy phenyl and the like; cycloaliphatic radicals having 5 to 8 carbon atoms inclusive such as cyclopentyl, cyclohexyl, oxycyclohexyl and the like.

Z, as previously stated, is a hydrolyzable group among which can be noted alkoxy radicals as previously described for V; oxy aryl radicals such as oxy phenyl and the like; oxyaliphatic radicals such as oxy hexyl and the like; halogens such as chlorine and the like and other hydrolyzable groups as further described in U.S. Pat. No. 3,408,420 to John B. Wiggill, patented Oct. 29, 1968.

Polysiloxanes can be prepared by reacting a diester having the formula:

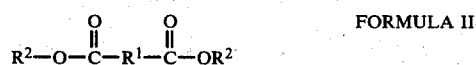

FORMULA II wherein each $R^2$, which can be the same or different, are hydrocarbon radicals as defined for V and $R^1$ is as previously defined, with a monomeric silane falling within the scope of Formula III.

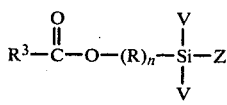

FORMULA III wherein $R^3$ is a hydrocarbon radical, as for example, an alkyl radical having one to 18 carbon atoms inclusive, preferably one to four carbon atoms inclusive such as methyl, ethyl, n-propyl, isopropyl, n-butyl and the like; alkylene radicals having two to 18 carbon atoms inclusive, preferably two to 4 carbon atoms inclusive such as ethylene, propylene and the like; aryl radicals having six to ten carbon atoms inclusive such as phenyl, benzyl and the like. Other variables are as previously defined.

Exemplary of suitable silanes falling within the scope of Formula II are the following:

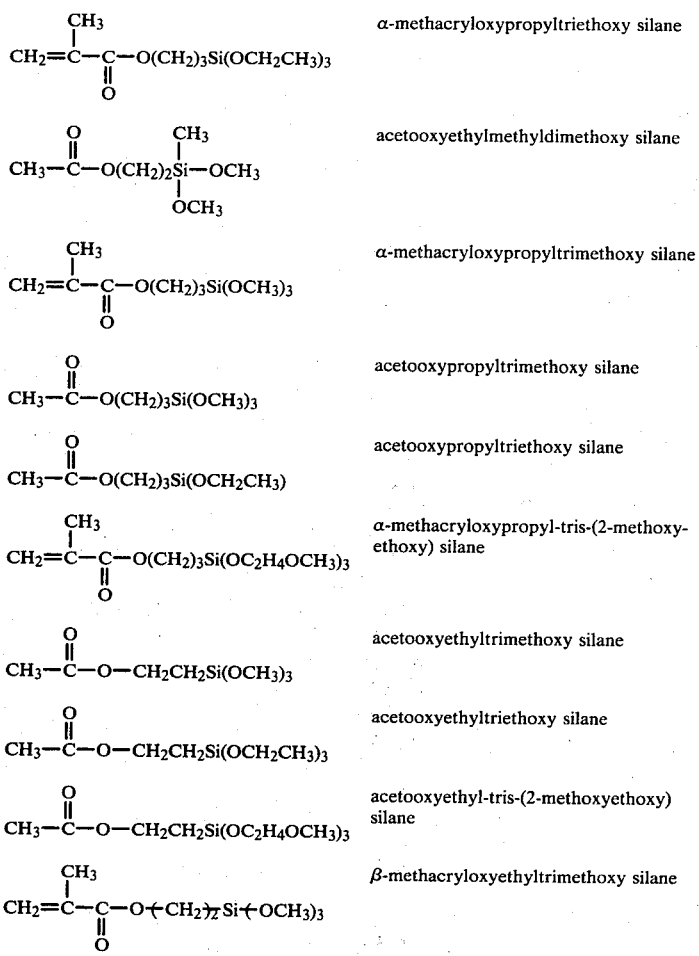

The polysiloxanes generally have a viscosity of about 100 centistokes to about 1000 centistokes preferably about 150 centistokes to about 250 centistokes, as determined using a Gardner viscosity tube at a temperature of 25° C.

The reaction between a diester of Formula II and a monomeric silane of Formula III and mixtures thereof is conveniently catalyzed by the use of an organo metallic catalyst such as a metal carboxylate or an organo titanate. Among suitable metal carboxylates can be noted dibutyltin dilaurate, stannous acetate, stannous octoate, lead naphthenate, zinc octoate, iron 2-ethyl hexoate and the like. Conditions employed for the production of polysiloxanes; reaction temperatures, amount of materials and the like, using metal carboxylates as catalysts are the same as subsequently described with respect to the use of organo titanates.

For purposes of the present invention, organo titanates are preferred. Organo titanate catalysts combine with the polysiloxanes to produce organo titanate modified polysiloxanes. These polysiloxanes can be used as such, without the use of additional organo titanate catalyst, to react with alkylene-alkyl acrylate copolymers, as will be explained.

Suitable organo titanates fall within the scope of Formula IV.

$$Ti(OR^4)_4 \qquad \text{FORMULA IV}$$

wherein each $R^4$, which can be the same of different, is hydrogen or a hydrocarbon radical having one to 18 carbon atoms inclusive, preferably one to 14 carbon atoms inclusive, with at least one $R^4$ being a hydrocarbon radical.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Particularly desirable titanates falling within the scope of Formula IV are those wherein each $R^4$ is alkyl having one to 18 carbon atoms inclusive, preferably one to 14 carbon atoms inclusive, exemplified by tetrabutyl titanate, tetraisopropyl titanate and the like.

Organo titanates falling with the scope of Formula IV are known compounds and can be conveniently prepared as described in U.S. Pat. No. 2,984,641 to Leon E. Wolinski, patented May 16, 1981.

Other suitable organo titanates are the organo titanium chelates such as tetraoctylene glycol titanium, triethanol amine titanate, titanium acetyl acetonate, titanium lactate and the like.

The catalyst, preferably an organo titanate, is used in an amount sufficient to catalyze the reaction between the diester and monomeric silane.

As a rule, the amount of catalyst used is on the order of about 0.001 to about 25 percent by weight, preferably about 0.5 to about 5 percent by weight, based on the weight of silane.

The temperature at which the reaction is conducted can be varied over a wide range, for example, from about 70° C. to about 200° C. A temperature in the range of about 100° C. to about 150° C. is preferred.

The reaction between the diester and the monomeric silane can be conducted under atmospheric, subatmospheric or superatmospheric pressure. It is preferred to conduct the later stages of the reaction under subatmospheric pressure to allow for more facile removal of volatile by-products.

Completion of the reaction is evidenced by cessation of the evolution of volatiles and the weight/volume of volatiles collected as compared to the theoretical weight/volume. Alternatively, the reaction can be run to a desired viscosity level and the reactants cooled to stop the reaction.

The repeating units of the polysiloxane, as shown in Formula I, can be varied by varying the mole ratio of the monomeric silane and diester reactants. For purposes of stoichiometric calculations, 2 molecules of a monomeric silane are deemed to react with one molecule of the diester, with x and y, in such case, each being one. Varying the mole ratio, results in varying the number of repeating units. For example, as is seen from Example 1, the mole ratio of monomeric silane to diester is 10 to 1. In that case, x and y, in the formula of the polysiloxane, ideally would be equal to 5. In carrying out the reaction, at least about a stoichiometric amount of reactants is used.

The alkylene-alkyl acrylate copolymers with which the polysiloxanes are reacted to form the silane modified copolymers are known copolymers produced by reacting an alkene with an alkyl acrylate.

Suitable alkenes are ethylene, propylene, butene-1, isobutylene, pentene-1,2-methylbutene-1,3-methylbutene-1, hexane, heptene-1, octene-1 and the like.

The alkylene moiety of the alkylene-alkyl acrylate copolymer generally contains from 2 to 18 carbon atoms inclusive, preferably 2 to 3 carbon atoms inclusive.

Suitable alkyl acrylate monomers, which are copolymerized with the alkenes, fall within the scope of the following formula:

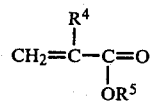

FORMULA V wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butyl-methacrylate, 2-ethylhexyl acrylate and the like.

Alkylene-alkyl acrylate copolymers generally have a density (ASTM D-1505 with conditioning as in ASTM D 147-72) of about 0.92 to about 0.94 and a melt index (ASTM-1238 at 44 psi tested pressure) of about 0.5 to about 500 decigrams per minute.

For purposes of the present invention, the preferred copolymer is a copolymer of alkylene-alkyl acrylate, generally having about one to about 50 percent by weight combined alkyl acrylate, preferably having about 2 to about 20 percent by weight combined alkyl acrylate.

The production of a silane modified copolymer of an alkylene-alkyl acrylate is carried out by reacting a polysiloxane, as described, with a copolymer of an alkylene-alkyl acrylate in the presence of an organo titanate catalyst.

In those instances wherein the polysiloxane contains combined organo titanate, additional organo titanate catalyst may not be necessary, especially when at least 0.5 percent by weight organo titanate, based on the weight of the silane, was used in the preparation of the polysiloxane.

The amount of organo titanate catalyst added to the reaction mixture is a catalytic amount, sufficient to catalyze the reaction between the polysiloxane and the copolymer. A preferred amount is from about 0.001 to about 50 percent by weight, most preferably about 0.1 to about 25 percent by weight based on the weight of the polysiloxane.

The amount of polysiloxane used can vary from about 0.05 to about 10 and preferably about 0.3 to about 5 percent by weight based on the weight of the copolymer.

The temperature at which this reaction is carried out is not critical and can vary conveniently, from about 80° C. to about 250° C. and preferably from about 150° C. to about 200° C.

The reaction can be carried out at atmospheric, subatmospheric or superatmospheric pressure, although atmospheric pressure is preferred.

Completion of the reaction is evidenced by measurement of no further viscosity change.

Recovery of the silane modified copolymer is effected by allowing the contents of the reaction flask to cool and discharging the product into a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder. The polysiloxane can be added to the fluxed copolymer and the organo titanate, if needed, then added. Alternatively, the organo titanate, if needed, can be added to the copolymer prior to the addition of the polysiloxane. Also, organo titanate and polysiloxane can be premixed and added to the fluxed copolymer.

The reaction between the polysiloxane and the alkylene-alkyl acrylate copolymer can be depicted as shown below:

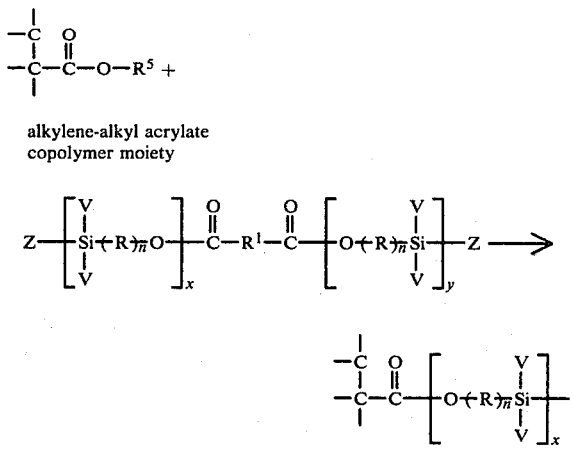

alkylene-alkyl acrylate copolymer moiety wherein the variables are as previously defined.

The curing or crosslinking of the silane modified alkylene-alkyl acrylate copolymer is effected by exposing the copolymer to moisture. The moisture present in the atmosphere is usually sufficient to permit curing to occur over a period of 48 hours.

The rate of curing, in a matter of 30 minutes, can be accelerated by exposure to an artifically humidified atmosphere or immersion in water and heating to elevated temperatures or by exposure to steam.

Generally, curing is effected at temperatures on the order of about 23° C. to about 100° C., preferably about 70° C. to about 100° C.

Additionally, the crosslinking may be carried out in the presence of a silanol condensation catalyst. A unique feature of this invention is that the crosslinking reaction can be carried out at signficant rates in the absence of added silanol condensation catalyst. The organo titanate catalysts or catalyst residues present in the production of the silane modified copolymers also catalyze the crosslinking reaction.

Alternatively, a wide variety of materials which function as silanol condensation catalysts and which are known in the art can be employed in the crosslinking process. Such materials include metal carboxylates previously described; organic bases such as ethylamine, hexylamine, dibutylamine, piperidine and the like and acids such as mineral acids and fatty acids and the like.

To the silane modified copolymers of this invention can be added various additives, in amounts well known in the art, such as fillers among which can be mentioned carbon black, clay, talc (magnesium silicate), calcium carbonate, silica, aluminum hydroxide and the like; antioxidants, lubricants and the like.

The silane modified copolymers can be rendered flame retardant by the addition thereto of halogen containing flame retardants such as ethylene-bis(tetrabromophthalimide), decabromodiphenyl oxide, chlorinated polyethylene, polyvinyl chloride and halogenated paraffin waxes, alone, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

Mixtures of reactants, catalysts and additives can be used, if so desired.

It is to be noted that the disclosure of all patents noted is incorporated herein by reference.

The following examples further illustrate the present invention and are not intended to limit the scope thereof.

EXAMPLE 1

Preparation of a polysiloxane based on acetooxyethyltrimethoxy silane and dimethylterephthalate.

Into a dried, one liter, 3-necked flask, equipped with a mechanical stirrer, thermometer, nitrogen gas inlet tube and take-off condenser, there was charged 356.7 grams (1.71) moles of acetooxyethyltrimethoxy silane. The acetooxyethyltrimethoxy silane was heated to a temperature of 80° C. and at this point, 3.33 cc (3.2 grams) of tetraisopropyl titanate were added to the flask by means of a syringe. Heating was continued and when the contents of the flask reached a temperature of 107° C., methyl acetate began to distill. After 102.6 grams of methyl acetate were collected, 33.0 grams (0.17 mole) of dimethylterephthalate were added to the contents of the flask. The contents of the flask were then brought to a temperature of 140° C. and maintained at this temperature, while under a vacuum of 10 inches, until cessation of volatiles.

Total amount of distillate recovered: 122.6 grams
Theoretical amount of distillate: 125.8 grams The polysiloxane recovered, in an amount of 270.3 grams, had the following idealized formula:

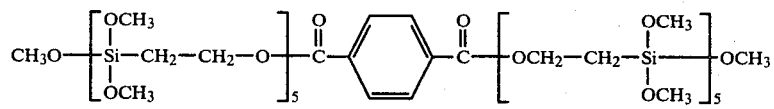

and was a highly viscous material.

Example 2

Preparation of a polysiloxane based on acetooxyethyltrimethoxy silane and dimenthylisophthalate.

Into a dried, one liter, 3-necked flask, equipped with a mechanical stirrer, thermometer, nitrogen gas inlet tube and take-off condenser, there was charged 356.7 grams (1.71 moles) of acetooxyethyltrimethoxy silane. The acetooxyethyltrimethoxy silane was heated to a temperature of 80° C. and at this point, 3.33 cc (3.2 grams) of tetraisopropyl titanate were added to the flask by means of a syringe. Heating was continued and when the contents of the flask reached a temperature of 107° C., methyl acetate began to distill. After 117.6 grams of methyl acetate were collected, 33.0 grams (0.17 mole) of dimethylisophthalate were added to the contents of the flask. The contents of the flask were then brought to a temperature of 140° C. and maintained at this temperature, while under a vacuum of 10 inches, until cessation of volatiles.
Total amount of distillate recovered: 123.7 grams
Theoretical amount of distillate: 125.8 grams The polysiloxane recovered, in an amount of 269.2 grams had the following idealized formula:

contents of the flask were then brought to a temperature of 140° C. and maintained at this temperature, while under a vacuum of 10 inches, until cessation of volatiles.
Total amount of distillate recovered: 728.4 grams
Theoretical amount of distillate: 760.2 grams The polysiloxane recovered, in an amount of 1628.6

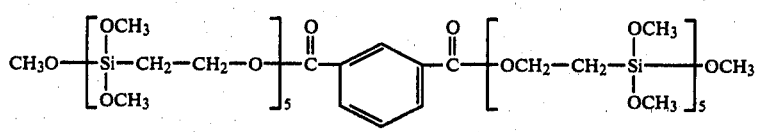

Viscosity of the polysiloxane—250 centistokes—determined at a temperature of 25° C. using a Gardner viscosity tube.

grams, had the following idealized formula:

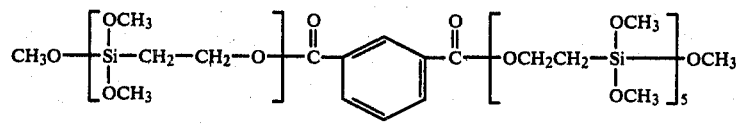

EXAMPLE 3

Preparation of a polysiloxane based on acetooxyethyltrimethoxy silane and dimethylisophthalate.

Into a dried, one liter, 3-necked flask, equipped with a mechanical stirrer, thermometer, nitrogen inlet tube and take-off condenser, there was charged 356.7 grams (1.71 moles) of acetooxythrimethoxy silane and 33.0 grams of dimethylisophthalate. The contents of the flask were heated to a temperature of 80° C. and at this point 3.33 cc (3.2 grams) of tetraisopropyl titanate were added to the flask by means of a syringe. The contents of the flask were then brought to a temperature of 140° C. and maintained at this temperature, while under a vacuum of 10 inches, until cessation of volatiles.
The total amount of distillate recovered: 123.6 grams
Theoretical amount of distillate: 125.8 grams The polysiloxane recovered, in an amount of 269.3 grams, had the following idealized formula:

EXAMPLE 5

Preparation of a water cured, silane modified alkylene-alkyl acrylate copolymer by reacting a mixture containing the polysiloxane of Example 4 and a copolymer of ethylene-ethyl acrylate.

To Composition A, the formulation of which is noted below, there was added:

|  | Percent by Weight Based On Weight of Composition A |
| --- | --- |
| Polysiloxane of Example 4 | 1.42 |
| Tetraisopropyl Titanate | 0.24 |
| Dibutyltin Dilaurate | 0.06 |
| Composition A |  |
| Ethylene-ethyl acrylate copolymer Melt Index 1.3 Percent by weight combined Ethyl acrylate - 15 | 56.1 |
| Talc coated with one percent Zinc stearate | 21.7 |

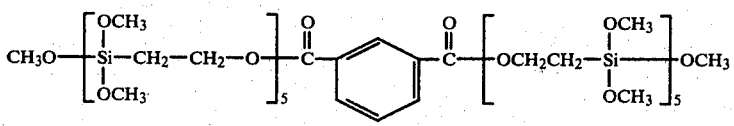

Viscosity of the polysiloxane—340 centistokes—determined at a temperature of 25° C. using a Gardner viscosity tube.

EXAMPLE 4

Preparation of a polysiloxane based on acetooxyethyltrimethoxy silane and dimethylisophthalate.

Into a dried, one liter, 3-necked flask, equipped with a mechanical stirrer, thermometer, nitrogen gas inlet tube and take-off condenser, there was charged 2140 grams (10.3 moles) of acetooxyethyltrimethoxy silane. The acetooxyethyltrimethoxy silane was heated to a temperature of 80° C. and at this point, 20 cc (19 grams) of tetraisopropyl titanate were added to the flask by means of a syringe. Heating was continued and when the contents of the flask reached a temperature of 107° C., methyl acetate began to distill. After 366.5 grams of methyl acetate were collected, 198 grams (1.02 moles) of dimethylisophthalate were added to the flask. The

| Ethylene bis(tetrabromophthalimide) | 16.3 |
| --- | --- |
| Calcium carbonate coated with Calcium stearate | 2.6 |
| Antimony trioxide containing 3 percent by weight white mineral oil | 2.5 |
| 2,2-dihydro-2,3,4-tetramethylquinoline (antioxidant) | 0.6 |
| Vinyl tris-(2-methoxyethoxy) silane (lubricant) | 0.2 |

All ingredients, with the exception of the organo titanate, the polysiloxane of Example 4 and the dibutyltin dilaurate were mixed to homogeniety in a Brabender mixer which had been preheated to a temperature of 160° C. After homogeniety was attained, the organo titanate, the dibutyltin dilaurate and the polysiloxane were introduced into the Brabender mixer. The mixture was reacted for 20 minutes at a temperature of 175° C.

and the resultant composition containing the water curable, silane modified alkylene-alkyl copolymer was discharged hot into a polyethylene bag and kept under a blanket of argon.

Samples of the composition were used to prepare test plaques, having dimensions of 3 inches by 8 inches by 0.125 inch in a press, under the following conditions:
Pressure: 5000 psi
Temperature: 130° C.
Time Cycle: 5 minutes Test plaques were cured by being immersed for 16 hours in a water bath, which was at a temperature of 70° C. and then tested for degree of "cure" according to the Monsanto Rheometer test, described in detail in U.S. Pat. No. 4,018,852, granted Apr. 19, 1977.
Monsanto Rheometer test —59 inch-lbs The results of the Monsanto Rheometer test indicated a high level of cure.

EXAMPLE 6

The composition of Example 5 was extruded onto a wire by the following procedure:

An initial feed, Formulation A of Example 5, was fed into a 2½, 20 to 1 (length to diameter) Royal Extruder wherein the initial feed was combined with a second feed, also described in Example 1, of polysiloxane, tetraisopropyl titanate and dibutyltin dilaurate. The amount of second feed was 1.85 percent by weight of the first feed. The weight ratio of polysiloxane to tetraisopropyl titanate to dibutyltin dilaurate was about 24 to 4 to 1. The resultant, reacted composition was extruded onto a #14 AWG solid copper wire under the following conditions:
Cycle: 1-2 minutes
Compound Temperature: 190° C.-200° C.

The coated wire was fed through a water trough, which was at ambient temperatures, with the result that the composition on the wire cured to a crosslinked product having a thickness of about 30 mils.

EXAMPLE 7

The polysiloxane of Example 2 and a polysiloxane, produced according to Example 3 of U.S. Pat. No. 4,328,323, were tested for thermal stability according to the Thermo Gravimetric Analysis test described in detail in Section 9 of E. I. DuPont deNemours Manual entitled "Instruction Manual 990 Thermal Analyzer and Modules." Time for each sampel to lose ten percent of its weight at the temperature indicated is tabulated below:

|  | 180° C. | 200° C. |
| --- | --- | --- |
| Polysiloxane of Example 2 | 25 minutes | 7 minutes |
| Polysiloxane of Example 3 of U.S. Pat. No. 4,328,323 | 10 minutes | 4 minutes |

What is claimed is:
1. A polysiloxane having the formula:

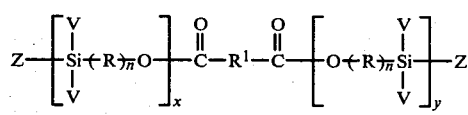

wherein each R is a hydrocarbon radical, $R^1$ is a hydrocarbon radical, each V is hydrogen, a hydrocarbon radical or a hydrolyzable group, Z is a hydrolyzable group, each n is an integer having a value of at least one and x and y are integers each having a value of at least one.

2. A polysiloxane having the formula:

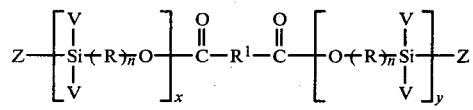

wherein each R is alkylene, $R^1$ is arylene or a cycloaliphatic radical, V is hydrogen, a hydrocarbon radical or a hydrolyzable group, Z is a hydrolyzable group, each n is an integer having a value of one to 1000 inclusive and x and y, each have a value of 1 to 20 inclusive.

3. A polysiloxane having the formula:

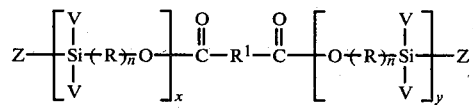

wherein each R is alkylene, $R^1$ is arylene, each V is alkoxy, Z is alkoxy, each n is an integer having a value of 5 to 10 inclusive and x and y are integers each having a value of 5 to 25 inclusive.

4. A polysiloxane as defined in claim 3 wherein each Z is methoxy, each V is methoxy, each R is —CH$_2$—CH$_2$—, $R^1$ is phenylene and x and y each have a value of 5.

5. A polysiloxane as defined in claim 1 containing combined organo titanate.

6. A process of preparing a polysiloxane which comprises reacting a mixture containing an organo metallic catalyst, a diester having the formula:

wherein each $R^2$ is a hydrocarbon radical, and $R^1$ is a hydrocarbon radical; and a monomeric silane having the formula:

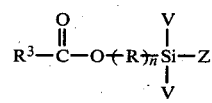

wherein $R^3$ is a hydrocarbon radical, R is a hydrocarbon radical, each V is hydrogen, a hydrocarbon radical or a hydrolyzable group, Z is a hydrolyzable group and n is an integer having a value of at least one.

7. A process of preparing a polysiloxane which comprises reacting a mixture containing a diester having the formula:

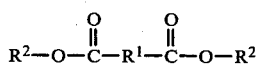

wherein each $R^2$ is a hydrocarbon radical and $R^1$ is arylene or or a cycloaliphatic radical, a monomeric silane having the formula:

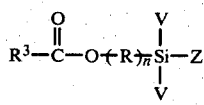

wherein $R^3$ is a hydrocarbon radical, R is alkylene, each V is hydrogen, a hydrocarbon radical or a hydrolyzable group, Z is a hydrolyzable group and n is an integer having a value of 2 to 25 inclusive; and a metal carboxylate or organo titanate catalyst.

8. A process as defined in claim 6 wherein the reaction is conducted at a temperature of about 70° C. to about 200° C.

9. A process as defined in claim 6 wherein the diester is dimethylterephthalate.

10. A process as defined in claim 6 wherein the diester is dimethylisophthalate.

11. A process as defined in claim 6 wherein the monomeric silane is acetooxyethyltrimethoxy silane.

12. A process as defined in claim 8 wherein the catalyst is an organo titanate.

13. A process as defined in claim 12 wherein the organo titanate is tetraisopropyl titanate.

14. A process as defined in claim 6 wherein the diester and monomeric silane are present in at least about a stoichiometric amount.

15. A process as defined in claim 6 wherein the catalyst is present in an amount of about 0.1 to about 25 percent by weight.

16. A process of preparing a water curable, silane modified alkylene-alkyl acrylate copolymer which comprises reacting a mixture containing an alkylene-alkyl acrylate copolymer, an organo titanate catalyst and a polysiloxane having the formula:

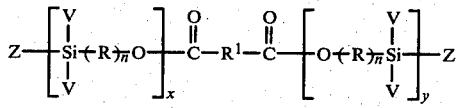

wherein each R is a hydrocarbon radical, $R^1$ is a hydrocarbon radical, each V is hydrogen, a hydrocarbon radical or a hydrolyzable group, Z is a hydrolyzable group, each n is an integer having a value of at least one, and x and y are integers each having a value of at least 1.

17. A process as defined in claim 16 wherein the alkylene-alkyl acrylate copolymer is ethylene-ethyl acrylate copolymer.

18. A process as defined in claim 16 wherein in the formula of the polysiloxlane: each R is alkylene, $R^1$ is arylene or a cycloaliphatic radical, V is hydrogen, a hydrocarbon radical or a hydrolyzable group, Z is a hydrolyzable group each n is an integer having a value of one to 1000 inclusive and x and y are integers each having a value of 1 to 20 inclusive.

19. A process as defined in claim 16 wherein in the formula of the polysiloxane, each Z is methoxy, each V is methoxy, each R is —CH$_2$—CH$_2$—, $R^1$ is phenylene and x and y each have a value of 5.

20. A process as defined in claim 16 wherein the organo titanate is present in an amount of about 0.1 to about 25 percent by weight based on the weight of the polysiloxane.

21. A process as defined in claim 16 conducted at a temperature of about 80° C. to about 300° C.

22. A process as defined in claim 16 conducted at a temperature of about 150° C. to about 300° C.

23. A process as defined in claim 16 wherein the organo titanate has the formula:

$$Ti(OR^4)_4$$

wherein each $R^4$ is hydrogen or a hydrocarbon radical, with one of said $R^4$ being a hydrocarbon radical.

24. A process as defined in claim 23 wherein the organo titanate is tetraisopropyl titanate.

25. A water-curable, silane modified alkylene-alkyl acrylate copolymer produced as defined in claim 16.

26. A composition of matter comprising an organo metallic catalyst, a diester and a monomeric silane, said diester and monomeric silane defined in claim 6.

27. A composition of matter comprising an organo titanate catalyst, an alkylene-alkyl acrylate copolymer and a polysiloxane as defined in claim 16.

* * * * *

UNITED STATES PATENT AND TRADEMARK OFFICE
CERTIFICATE OF CORRECTION

PATENT NO. : 4,408,011

DATED : October 4, 1983

INVENTOR(S) : Austin E. Barnabeo

It is certified that error appears in the above—identified patent and that said Letters Patent is hereby corrected as shown below:

Column 3, line 18; "$\alpha$" should read --$\gamma$--.
Column 3, line 24; "$\alpha$" should read --$\gamma$--.
Column 3, line 31; "$\alpha$" should read --$\gamma$--.
Column 8, line 54; "dimenthylisophthalate" should read --dimethylisophthalate--.
Column 9, line 31; "acetooxythrimethoxy" should read --acetooxyethyltrimethoxy--.
Claim 3, next to last line; "5 to 10" should read --2 to 25--.
Claim 3, last line; "25" should read --10--.
Claim 15, line 2; "0.1" should read --0.001--.
Claim 21, last line; "300°C" should read --250°C--.
Claim 22, last line; "300°C" should read --200°C--.

Signed and Sealed this

Thirty-first Day of January 1984

[SEAL]

Attest:

GERALD J. MOSSINGHOFF

Attesting Officer     Commissioner of Patents and Trademarks